United States Patent [19]

Kovacs, Jr.

[11] Patent Number: 5,748,713
[45] Date of Patent: May 5, 1998

[54] METHOD FOR AUTOMATICALLY INITIATING A CALLING CARD TELEPHONE CALL

[75] Inventor: Frank Kovacs, Jr., East Brunswick, N.J.

[73] Assignee: AT&T Corp., Middletown, N.J.

[21] Appl. No.: 717,396

[22] Filed: Sep. 20, 1996

[51] Int. Cl.⁶ .................................................. H04M 11/00
[52] U.S. Cl. ................................................ 379/95; 235/382
[58] Field of Search ................................ 235/382; 379/95

[56] References Cited

U.S. PATENT DOCUMENTS 5,406,619  4/1995  Akhteruzzaman ....................... 379/95

*Primary Examiner*—Harold Pitts
*Attorney, Agent, or Firm*—Robert B. Levy

[57] ABSTRACT

A calling card telephone call may be automatically initiated by the aid of an intelligent cared (10) having the capability of generating a first and second sequences of DTMF signals. Upon actuating the card in a first manner, the card generates the first DTMF signal sequence that corresponds to a calling card carrier access number. Upon actuating the card in a second manner, the card generates the second DTMF signal sequence corresponding to a card holder personal identification code. Thus, by actuating the card in the first and second manner, a card holder can effectuate the input of the carrier access number and card holder personal identification number, respectively, without having to enter this information via a key pad, thereby gaining reducing the incidence of card fraud.

8 Claims, 2 Drawing Sheets

METHOD FOR AUTOMATICALLY INITIATING A CALLING CARD TELEPHONE CALL

TECHNICAL FIELD

This invention relates to a technique for automatically dialing an access number and a personal identification number to initiate a calling card telephone call through a telephone network.

BACKGROUND ART

Present day telecommunication carriers, such as AT&T, offer subscribers the opportunity to place a call from any terminal to a called party and have the charges associated with the call billed to a particular account number maintained by the carrier in the subscriber's name. Calls made in this manner are often referred to "calling card" calls because the account number associated with billing is typically provided to the customer on a card similar to a credit card. In this way, the subscriber can keep the card number in a wallet or the like for ready access to facilitate making this type of call.

In order to make a calling card call, the subscriber must enter the calling card number, usually by entering the appropriate digits through the key pad of the telephone. Unless the subscriber has memorized the calling card number (which may comprise as many as fourteen digits), a typical subscriber will often refer to the calling card to obtain the number. When referencing the card, the subscriber may expose the number to unscrupulous individuals who may observe the number and thereafter use it to make unauthorized calls. Often, those responsible for making such fraudulent calling card calls are never identified so restitution cannot be obtained. Consequently, most carriers absorb the cost of fraudulent calling card calls rather than bill the card holder who was innocent of any wrongdoing. The cost absorbed by carriers for fraudulent calls is often high, as is the level of frustration of both the card holder and the carrier as a result of this type of fraud.

Another difficulty associated with placing a calling card call may be accessing the carrier who maintains the calling card account in the subscriber's name. Often, the carrier with whom the subscriber maintains a calling card account is different from the local exchange carrier from whom the subscriber obtains local service. To access the carrier that maintains the subscriber's calling card account, the subscriber must dial a special number (i.e., an access number) to reach the calling card carrier. For example, a subscriber that maintains a calling card account with AT&T can access AT&T from any telephone by dialing 1-800 CALL-ATT. While this particular access number is relatively easy to dial, calling card holders occasionally do mis-dial this access number, causing frustration.

Some unscrupulous pay telephone operators have attempted to prevent AT&T calling card holders, and those of other inter-exchange carriers from using their calling cards at pay telephones by purposely removing the alphabetic designations on the telephone key pads. Many calling card holders only remember the calling card carrier access number in terms of its alphabetic representation. In the absence of any letters on the telephone key pad, a subscriber may not be able to enter the carrier access number. Under such circumstances, calling card holders are forced to rely on the carrier pre-subscribed to the pay phone to carry their call, often at exorbitant rates.

Thus, there is a need for a technique for automatically initiating a calling card call that reduces the incidence of fraud and that facilitates calling from any phone, including those which lack alphabetic designations on their key pads.

BRIEF SUMMARY OF THE INVENTION

Briefly, in accordance with the invention, a method is provided for automatically initiating a calling card call that requires the entry of a carrier access code and personal identification code. The method is initiated by providing a subscriber with a calling card having the capability of automatically generating at least a first and second Dual-Tone Multi-Frequency (DTMF) signal sequences. The first and second DTMF signal sequences correspond to a calling card carrier access telephone number and the subscriber's personal identification code. To actually initiate a call, the subscriber places the card in proximity to a transmitter of a telephone handset that is off hook. Thereafter, the subscriber actuates the card in a first manner by contacting a first location of the card to cause the card to generate the first DTMF signal sequence, thereby effectuating dialing of the calling card carrier access number. Thereafter, the subscriber actuates the card in a second manner, typically by contacting a the card in several locations other than the first location, to generated the second DTMF signal sequence in response to a prompt from the calling card carrier to enter the personal identification code.

By actuating the calling card to generate the first and second sequence of DTMF signals and thereby enter the carrier access number and the personal identification code, the subscriber thus avoids the need to manually dial these numbers. As a result, the incidence of calling card fraud caused by unscrupulous individuals gaining unauthorized access to a subscriber's personal identification code is reduced since the subscriber does not expose his or her personal identification number through dialing. Further, the incidence of mis-dialing the carrier access number and personal identification code is reduced.

DETAILED DESCRIPTION

Figure 1:
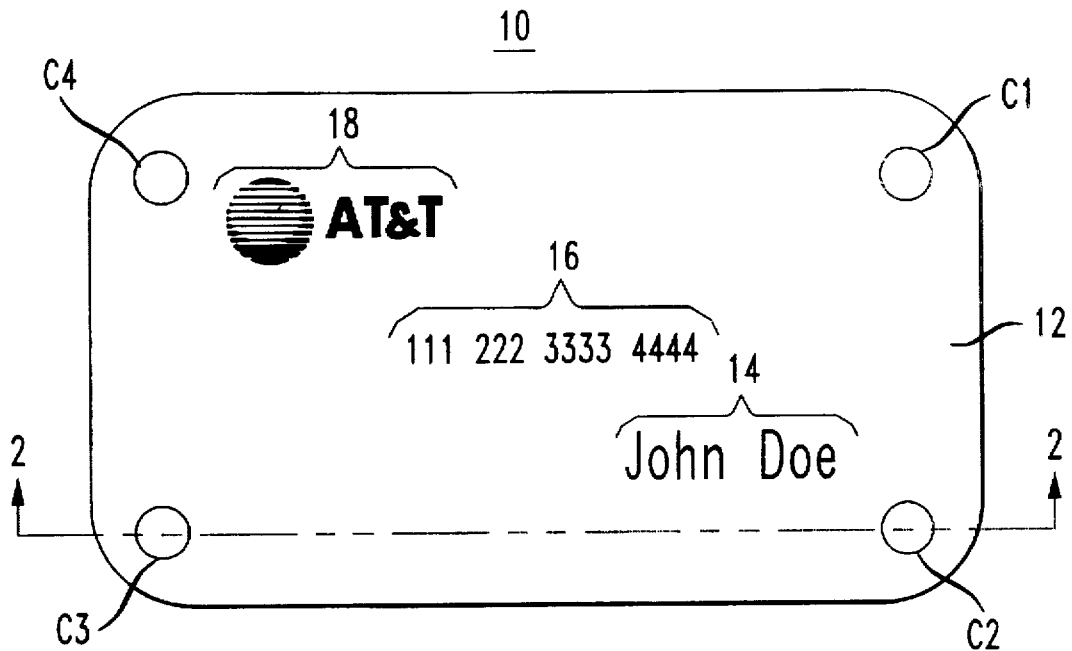
FIG. 1 is a plan view of a calling card in accordance with the present invention.

FIG. 1 depicts a calling card 10 in accordance with a preferred embodiment of the invention. The card 10 is sized similar to an ordinary credit card as are well known in the art. However, the card 10 actually comprises a personal data card of the type disclosed in U.S. Pat. Nos. 4,921,160 and 5,272,596, herein incorporated by reference. In particular, the card 10 contains electronic circuitry, as will be discussed in greater detail hereinafter, for generating at least a first and second sequence of DTMF signals corresponding to a first and second string of dialed digits.

The card 10 of FIG. 1 has an upper surface 12 that may include several indicia, either printed or embossed on the card surface. For example, the surface 12 may include a first indicia 14 representing the name of the subscriber. Additionally, the surface of the card may also include a second indicia 16 indicative of all or a portion of the calling card account number of the subscriber. For security reasons, it may be desirable to omit the indicas 14 and 16 to protect the identity of the subscriber and the subscriber's account number. Lastly, the card may include an indicia 18, such as the corporate logo of the carrier that maintains the subscriber's calling card account.

The surface 12 of the card 10 also has four regions, designated as C1, C2, C3 and C4, respectively, that overly a corresponding one of four switches (described hereinafter), respectively, within the card itself. Typically the regions C1, C2, C3 and C4 correspond to the areas near a separate one of the four corners of the card. By depressing each of the regions C1, C2, C3 and C4, a subscriber may actuate a corresponding one of the switches to generate the first and second DTMF signal sequences.

Figure 2:
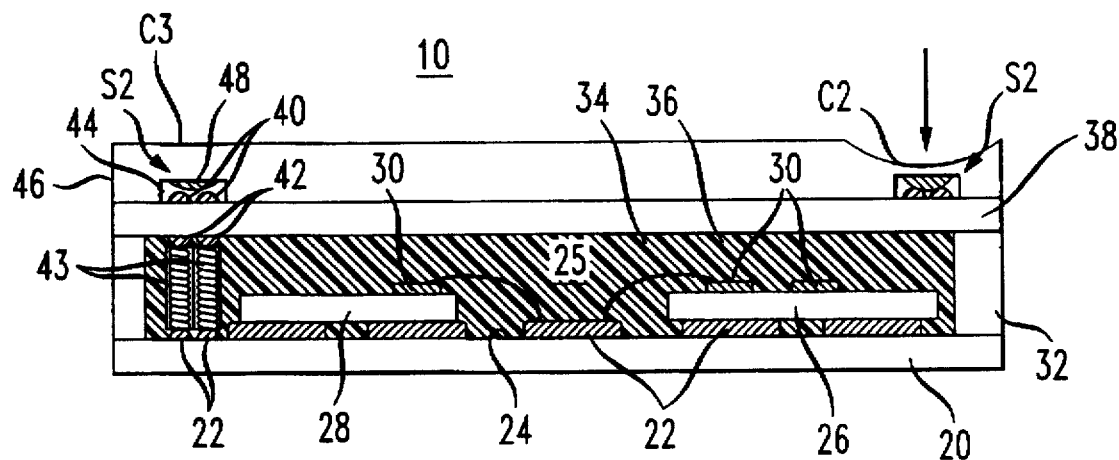
FIG. 2 is a front view, in cross-section, of the calling card of FIG. 1 taken along the plane 2—2.

The internal details of the card 10 are depicted in FIG. 2. As seen in that figure, the card 10 comprises a first circuit board 20, typically fabricated from FR-4 or from a thick film polymer, as taught in U.S. Pat. No. 5,272,596 (herein incorporated by reference). The circuit board 20 has a plurality of metallized pads 22—22 on its upper surface 24 for mounting circuitry 25 described in greater detail in FIG. 3. Among the elements comprising the circuitry 25 are a repertory dialer integrated chip 26 and a logic gate integrated circuit 28, both bonded to a set of metallized pads 22—22 on the circuit board surface 24. Each of the chips 26 and 28 typically has a plurality of metallized pads 30—30 on its upper surface, each wire-bonded to a corresponding metallized pad 22 on the circuit board to interconnect the chips.

Overlying the circuit board 20 is a card body 32 having an opening 34 for accommodating the chips 26 and 28 as well as other elements of the circuitry 25 (not shown). Once the circuitry 25 is in place, the opening 34 is filled with a filler 36, such as epoxy or the like. A second circuit board 38 overlies the body 32. The circuit board 38 has metallized areas 40—40 on its upper surface connected to metallized areas 42—42 on its lower surface via conductive through vias (not shown) in the circuit board. Each of the metallized areas 42—42 on the lower surface of the circuit board 38 is electrically connected via a column 43 of anisotropically conductive material to a corresponding metallized pad 22 on the circuit board 20.

Each of a pair of the metallized areas 40—40 on the top surface of the circuit board 38 lies within a cavity 44 in the undersurface of a cover plate 46 that overlies the circuit board. Each cavity 42 in the top plate 46 lies immediately below a corresponding one of the regions C1, C2, C3 and C4 on the card as depicted in FIG. 1. On the ceiling of each cavity 44 in the top plate 46 is a thin conductive layer 48, formed from a carbon film or the like. In the absence of any pressure on the top plate 46 in the region C3 of the card 10 as seen in FIG. 2, the conductive layer 48 in the ceiling of the cavity 44 lying below the region C3 remains out of electrical contact with the metallized area 40—40 therebelow. Consequently, the metallized areas 40—40 are not in electrical contact with each other.

However, if the region C2, for example, is depressed, as seen in FIG. 2, then the film 48 will come into contact with, and electrically connect, a corresponding pair of metallized areas 40—40. As may now be appreciated, the combination of the conductive 48 layer and the pair of metallized areas 40—40 lying in each cavity 44 underlying a corresponding one of the regions C1, C2, C3 and C4 forms one of a set of electrical switches $S_1$, $S_2$, $S_3$ and $S_4$, respectively, described hereinafter with respect to FIG. 3.

Figure 3:
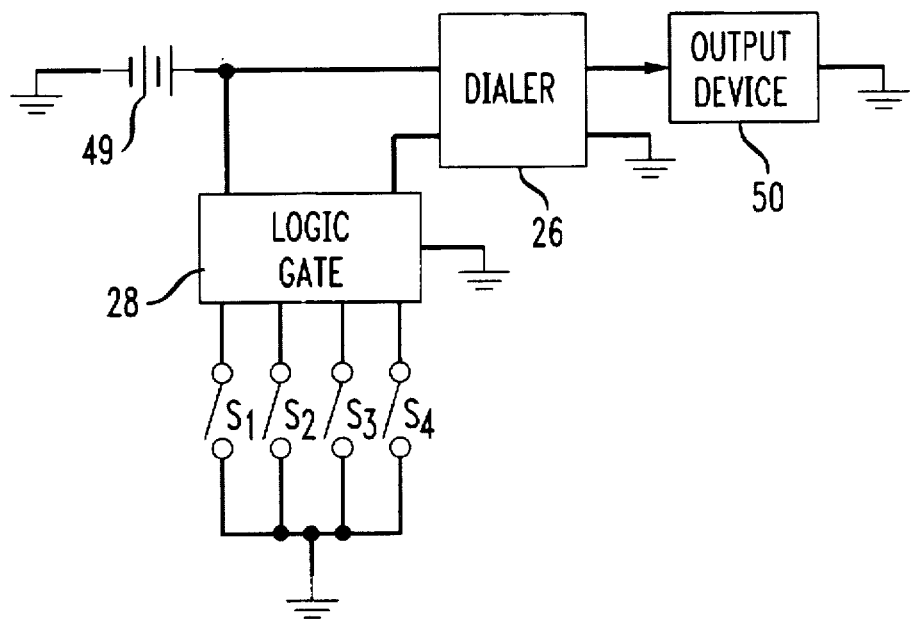
FIG. 3 is a schematic diagram of circuitry within the card of FIG. 1 for generating at least a first and second DTMF signal sequences.

FIG. 3 shows a schematic diagram of the circuitry 25 that includes the previously discussed repertory dialer chip 26. Typically, the chip 26 is powered by a battery 49. The repertory dialer chip 26 may take the form of any of several will known integrated circuits capable of generating separate sequences of DTMF signals. For example, the chip 26 may comprise a model MK 53761 repertory dialer manufactured by SGS Thompson Microelectroincs or a model PCD 3310 pulse and DTMF dial with re-dial dial manufactured by Philips Semiconductor. Both of these devices include an on-board oscillator for generating DTMF signals, as well as an on-board memory for storing two of more sequences of DTMF signals. One such DTMF signal sequence preprogrammed in the dialer chip 26 corresponds to a string of DTMF signals, which is dialed, would simulate the access number of a calling card carrier. For example, in the case when AT&T is the calling card carrier, the chip 26 is programmed to generate a DTMF signal sequence corresponding to the digits representing the number 1-800-CALL ATT (1-800-225-5288). Another DTMF signal sequence programmed into the dialer chip 26 represents a string of digits that corresponds to the card holder's personal identification code. Thus, the second DTMF signal sequence programmed into each dialer 26 chip is unique. The dialer chip 26 has its output coupled to an output device 50, typically a piezoelectric crystal, or a speaker that provides audible signals for receipt by a telephone transmitter (see FIG. 4).

The logic gate chip 28 comprises a logic gate array, as are well known in that art. Like the chip 26, the chip 28 is powered by the battery 49. The logic gate chip 28 is programmed to produce a signal at a particular level at its output in accordance with a prescribed sequence of signals at its input. The output of the logic gate chip 28 is coupled to the dialer chip 26 while each of four inputs to the logic chip is coupled by a separate one of the switches $S_1$, $S_2$, $S_3$ and $S_4$ to ground.

In the preferred embodiment, the logic gate chip 28 is programmed so that upon closure of a first one of the switches, say $S_1$, the gate produces a first output signal. In response to this first output signal, the dialer chip 28 generates the first sequence of DTMF signals corresponding to the access telephone number of the calling card carrier. Upon closure of each of the remaining three switches in a prescribed sequence, say $S_2$, $S4$ and $S_3$, the logic gate chip 28 generates a second output signal. In response to the second output signal from the logic gate chip 28, the dialer chip 26 generates the second DTMF signal sequence, representing the card holder's personal identification code. If an improper sequence of switches $S_2$-$S_4$ is actuated, the logic gate chip 28 is typically programmed to disable the card by not responding to any subsequent sequences of switches $S_1$-$S_4$.

It could be possible to configure the card 10 to eliminate the logic gate 28 and simply have a pair of the switches, say switches $S_1$ and $S_2$. These switches would be coupled directly to dialer chip 26 so that upon closure of each of the two switches, the dialer chip would generate its first and second DTMF signal sequences, respectively. However, for security reasons, it is desirable to require that the switches $S_2$-$S_4$ to be actuated in a prescribed sequence. In this way, if the card 10 is lost or stolen, the likelihood of card misuse can be reduced.

In some instances, it may be desirable to program the dialer chip 26 to generate more than two sequences of DTMF signals. For example, the dialer chip 26 could be programmed to generate alternate second sequences of DTMF signals representing two alternative personal identification codes. For example, a card holder may wish to have separate calling card accounts for business and personal use. To access each of these accounts, the card holder would actuate the card 10 to generate the sequence of DTMF signals corresponding to the personal identification number of that account. To that end, the logic gate chip 28 would be programmed so that each second DTMF signal sequence representing a particular personal identification code would require a unique closure sequence of switches $S_2$–$S_4$. By the same token, the dialer chip 28 could be programmed to generated two alternate first sequences of first DTMF signals, representing different carrier access codes. Each alternate first sequence would be generated upon actuation of a separate first region, i.e., a separate one of the switches $S_1$–$S_4$.

Figure 4:
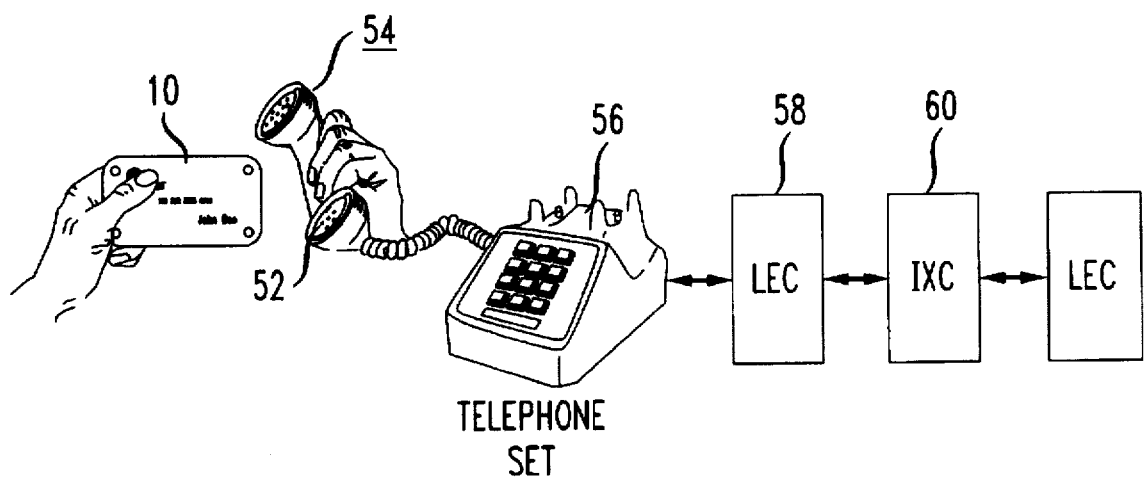
FIG. 4 depicts the manner of using the card of FIG. 1 to automatically initiate a calling card call.

FIG. 4 illustrates the manner in which the card 10 is used to automatically initiate a calling card call. To initiate such a call, the card 10 is placed in proximity to the transmitter portion 52 of a telephone hand set 54 that is off hook with respect to its associated telephone set 56. Thereafter, the card 10 is actuated in the manner discussed above to generate the first DTMF signal sequence corresponding to the calling card carrier access telephone number. With the telephone set 56 off hook, the first DTMF signal sequence passes from the set to a Local Exchange Carrier (LEC) 58 that provides the subscriber of the telephone set with dial tone. The first DTMF signal sequence, simulating the dialing sequence associated with the calling card carrier access number, causes the LEC 58 to connect to the calling card carrier (i.e., inter-exchange carrier 60). Following a connection between the telephone set 56 and the inter-exchange carrier 60 through the LEC 58, the inter-exchange carrier then prompts the holder of the calling card 10 to enter the card holder's personal identification code. As discussed, the holder of the calling card 10 enters his or her personal identification code by actuating the regions C2–C4 in a prescribed sequence to actuate the switches $S_2$–$S_4$ in that sequence. Assuming that the card holder's personal identification code is valid, the inter-exchange carrier 60 then prompts the calling card holder to enter the telephone number of the party to be called. Upon receipt of the number of the called party, the inter-exchange carrier 60 maintaining the account of the calling card holder then routes the call to the LEC, say LEC 60, serving the called party.

The foregoing describes a technique for initiating a calling card call via a card (10) having the capability of automatically generating a first and second sequences of DTMF signals corresponding to a calling card carrier access number and card holder personal identification code, respectively.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for automatically initiating a calling card telephone call that requires the entry of a calling card carrier access telephone number and a card holder personal identification code, comprising the steps of:

placing a calling card, having the capability of generating a first and second sequences of DTMF signals corresponding to the calling card carrier access telephone number and calling card holder personal identification code, in proximity to a transmitter of a telephone handset that is off hook relative to its telephone set;

actuating the card a first time by contacting a first region thereon to cause the card to generate the first sequence of DTMF signals; and actuating the card a second time by actuating a plurality of regions on the card to cause the card to generate the second sequence of DTMF signals corresponding to the card holder's personal identification code.

2. The method according to claim 1 wherein the second plurality of regions must be contacted in a prescribed sequence to actuate the card to generate the second sequence of DTMF signals.

3. The method according to claim 2 including the step of disabling the card if the second plurality of regions are not contacted in the prescribed sequence.

4. The method according to claim 1 wherein the card has the capability of generating at least two second sequences of DTMF signals, each representing an alternative personal identification code.

5. The method according to claim 4 wherein the second plurality of regions are contacted in each of two separate sequences to generate each of the second sequences of DTMF signals.

6. The method according to claim 1 wherein each of the second plurality of regions corresponds to one of the corners of the card.

7. The method according to claim 1 wherein the card has the capability of generating at least two first sequences of DTMF signals, each representing an alternative carrier access telephone.

8. The method according to claim 7 wherein each of the two first sequences is generated by contacting a separate one of two first regions on the card.

* * * * *